US006722079B2

(12) United States Patent
Schumer

(10) Patent No.: US 6,722,079 B2
(45) Date of Patent: Apr. 20, 2004

(54) FISHING LURE WITH SNAG RELEASE

(76) Inventor: Carl Schumer, 11562 Richwood Church Rd., Walton, KY (US) 41094

( * ) Notice: Subject to any disclaimer, the term of this patent is extended or adjusted under 35 U.S.C. 154(b) by 0 days.

(21) Appl. No.: 09/821,309

(22) Filed: Mar. 29, 2001

(65) Prior Publication Data

US 2002/0139037 A1 Oct. 3, 2002

(51) Int. Cl.[7] ............................................... A01K 85/00
(52) U.S. Cl. ..................................... 43/42.04; 43/17.2
(58) Field of Search .............................. 43/17.2, 42.12, 43/42.49, 43.1, 42.72, 42.83, 42.04

(56) References Cited

U.S. PATENT DOCUMENTS

| 1,200,135 | A | * | 10/1916 | Reynolds | 43/42.04 |
|---|---|---|---|---|---|
| 1,682,711 | A | * | 8/1928 | Pflueger | 43/42.04 |
| 2,256,173 | A | * | 9/1941 | Schechterle | 43/42.04 |
| 2,275,869 | A | * | 3/1942 | Seaton | 43/42.04 |
| 2,459,288 | A | * | 1/1949 | Robbins et al. | 43/42.04 |
| 2,565,660 | A | * | 8/1951 | Krilich | 43/42.04 |
| 2,796,692 | A | * | 6/1957 | Harely | 43/42.04 |
| 3,541,720 | A | * | 11/1970 | Buffet | 43/42.19 |
| 4,920,685 | A | * | 5/1990 | Landuydt | 43/42.04 |

* cited by examiner

Primary Examiner—Kurt Rowan
(74) Attorney, Agent, or Firm—R. Christian Macke

(57) ABSTRACT

A system for use with fishing lures that allows partial release of the lure upon becoming snagged. The lure is attached to a fishing line at a head end and by way of a line extension leader at a hook end. The line extension comprises a heavy gauge leader extending the length of the lure. A fish decoy is permanently affixed to the line at a hook end, and releasably attached at a head end. A line attachment clip provides three attachment loops, one of the loops being a resilient, releasable leg. The line attachment clip has a line loop to which the fishing line is securely attached, a leader loop to which the leader is securely attached, and a releasable leg to which the head eyelet of a lure is attached. Upon application of sufficient force, the head eyelet is released so that the lure becomes inverted, allowing is to be freed from a snag and reeled in with the hooks in the opposite orientation.

3 Claims, 2 Drawing Sheets

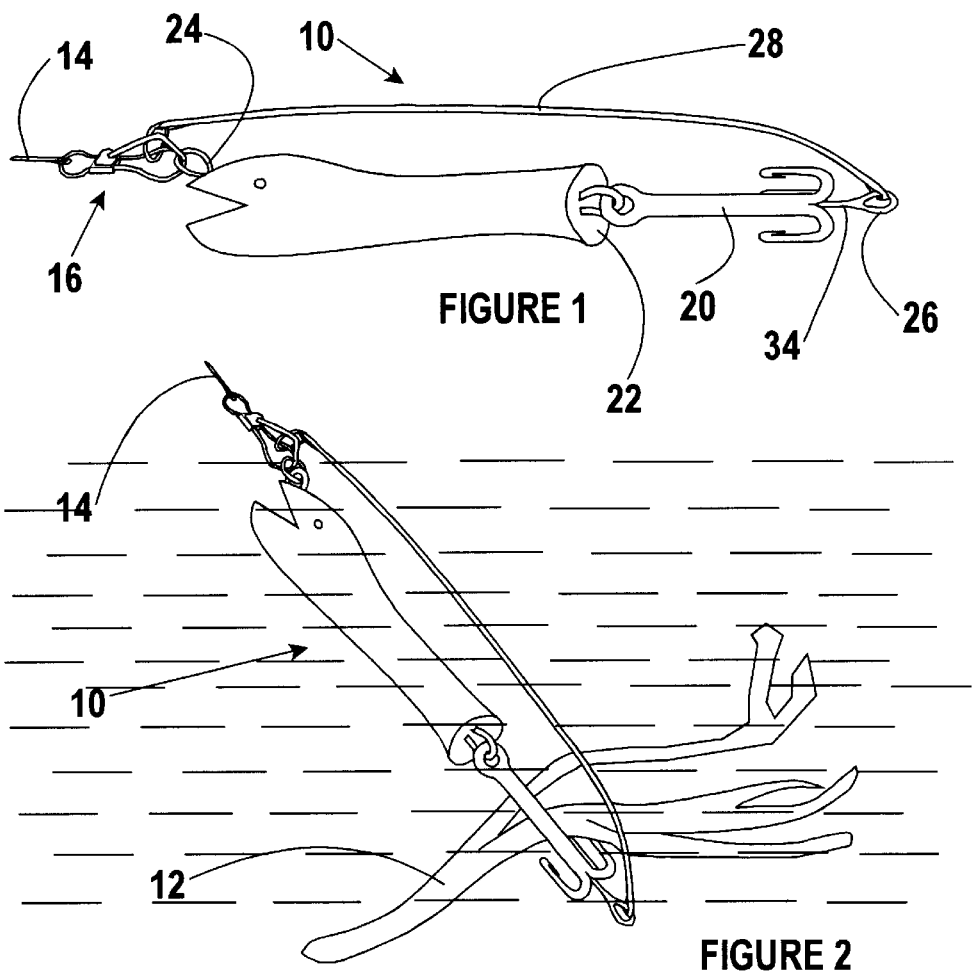
FIGURE 1
FIGURE 2
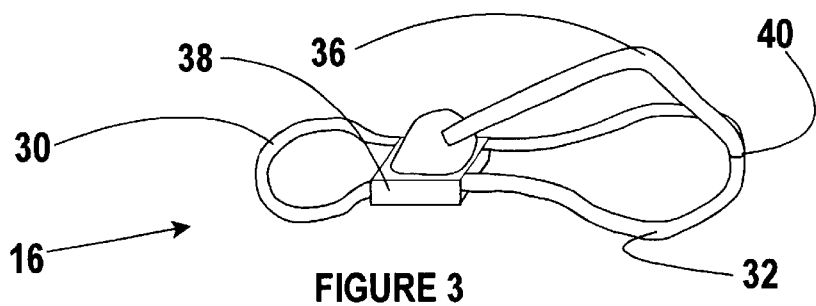
FIGURE 3

FISHING LURE WITH SNAG RELEASE

FIELD OF THE INVENTION

A fishing lure is provided that comprises a modified line attachment clip allowing partial release and reorientation of the lure from the line when the lure becomes snagged.

BACKGROUND OF THE INVENTION

Fishing as a sport, hobby and even national past-time is important enough that millions of dollars every year are spent by its participants for developments and innovations in an effort to improve their results and reduce the need for embellishment of "fish tales". A common problem experienced by fishermen, from novices to experts, is the snagging of lures and lines on seen and unseen hazards. This problem is and will always be of great concern because, often, the best fishing locations are found amongst fallen tree limbs, weeds and plant life, which are also the most frequent source of snagged lines and lures.

In a sport such as fishing, wherein the psychology and emotional element is significant and superstitions about lucky lures or fishing locations are common, the snagging and loss of a favorite lure or reluctance to fish in a good spot because of the risk of snagging a favorite lure can, at least in the mind of the fisherman himself, greatly affect his ability and success. In addition, as the design and technology in fishing equipment have evolved, specifically the use of specialized lures, the most effective lures have become quite expensive. Thus, a fisherman encountering a snag and loss of a particularly effective lure will obviously be dejected at the loss of the lure, but he will also feel the loss in his wallet if the lure was an expensive one.

The problem of snagged lines and lost lures is not new, and there have been many attempted solutions to the problem. In the vast majority of the prior art snag release apparatuses, a weighted device, connected to a second line and pole used by the fisherman, is clipped onto the snagged line. The weighted device then travels along the snagged line until it engages and strikes the lure and/or hook that is snagged. If successful, the weighted device knocks the lure and/or hook free from the snag so that the fisherman can retract both lines, along with the weighted device and snagged lure. Examples of such weighted snag release devices can be found in U.S. Pat. No. 520,052 to Hirschmann; U.S. Pat. No. 892,730 to Immel; U.S. Pat. No. 2,316,500 to Bray; U.S. Pat. No. 2,494,012 to Stricker; U.S. Pat. No. 2,586,073 to McKee; as well as a large number of other similarly functioning devices.

There are a number of disadvantages with the snag release devices disclosed in the prior art, however. First, they require additional equipment (another pole, line, and the weighted device itself) and they depend upon gravity to accelerate the weighted device downwardly sufficiently to knock the snagged lure and/or line free from the snag. Obviously such devices will be more effective when the snagged line is generally vertical; when the snagged line is horizontal, gravity will not accelerate the weight toward the snag, and the chances that the snag will be released are diminished. Secondly, the prior art weighted devices often do not work for any of various reasons (e.g. the snagged line is horizontal and the weight doesn't knock it loose or the snag is just too elaborate to easily free the snagged line). In those cases, the fisherman that drops a weighted snag releasor to retrieve his lure may very well be throwing good money after bad, because in many cases the weighted snag releasor itself becomes entangled and cannot be extricated.

The present invention seeks to simplify the process for releasing a snagged lure by incorporating within the lure itself means for releasing part of the lure from the fishing line so that the lure is reoriented and the fisherman's pulling force on the line is reversed so that the hook and lure are pulled in the opposite direction out of the snag. As will be discussed in more detail herein, the snag release provisions of the present invention have the benefits discussed herein because the attachment of the fishing line to the lure at two separate points wherein one point of attachment is releasable upon application of sufficient force on the fishing line.

In U.S. Pat. No. 3,447,828 to Hanson, a device is disclosed that retrieves tackle that has been snagged. The '828 patent is not itself a fishing device; instead it uses a heavy rope or cable 10 and another length of rope or cable to bridge the two points of attachment to the device.

The '828 patent includes, significantly, a spring loaded rod 13 which, when sufficient force is applied along the line 10, the rod 13 moves so that the rod end 13a moves to allow disengagement of the hook end 24. Thus, the hooks 27 may be flipped so that they can be extricated from the snag.

The present invention differs from the '828 device in a number of significant and unobvious ways. First, the present invention is a fishing lure with snag release provisions unlike the '828 device which does not use fishing line and does not, itself, provide a device for catching fish.

Second, the principles of the present invention are applicable to make virtually any lure a snag free lure because releasability of the line from one of two points is achieved as a result of the design of the modified line attachment clip. The present invention does not require the use of a complex, spring loaded releasing rod and plunger arrangement. Instead, any lure with attachment eyelets at both ends may be used with the modified line attachment clip of the present invention to provide a lure that is releasable upon being snagged.

Third, the present invention incorporates the use of a heavy gauge, rigid lead wire extending between the two points of attachment to the lure. The design of the leader is intentional so that, when the line is attached at both ends of the lure, as discussed in more detail herein, the lure behaves underwater as a standard lure having only one point of attachment to the line. Once released, however, the leader acts as an extension of the fishing line, allowing the lure to be inverted to remove itself from the snag.

The present invention provides an efficient and easily applied solution to make fishing lures releasable from snags, without impacting the lure's effectiveness.

OBJECTS OF THE INVENTION

It is an object of the present invention to provide a means for releasing snagged fishing lures and lines from underwater obstructions without requiring a second line or weight to knock the snagged lure free.

It is another object of the present invention to provide a general snag release system applicable to fishing lures requiring only minor modifications.

It is a further object of the present invention to provide a simplified snag release system utilizing a line attachment clip having a resilient, releasable leg that is released only upon application of sufficient force.

It is yet another object of the present invention to provide a snag release system utilizing attachment of the fishing line to both opposed ends of a lure wherein the attachment at one end is releasable.

It is a further object of the present invention to provide a fishing lure having snag release provisions that do not affect the performance of the lure in ordinary use.

It is yet another object of the present invention to provide a snag free fishing lure that has a simple release mechanism allowing the lure to be reoriented to be inverted so that when force is applied of sufficient magnitude, the force will pull the hook attached to the lure in the opposite direction.

These and other objects of the present invention are satisfied by the preferred embodiment of the invention described in more detail herein. These objects are meant to be illustrative and not limiting. The manner of operation, novel features and further objects and advantages of this invention may be better understood by reference to the description and drawings set forth herein.

SUMMARY OF THE INVENTION

The present invention is a snag releasable system for attaching a fishing line to a lure. It comprises a lure having two opposed ends and means for attaching the line to both of the opposed ends. The present invention is particularly advantageous in that the means for attaching the line is releasable.

The fishing lure of the present invention has, as its two opposed ends, a head end and a hook end, the hook end comprising a hook being permanently affixed to a tail end of a fish decoy. A head eyelet is secured to the head end of the fish decoy, and a hook eyelet is affixed to a hook extension attached to the hook opposite the hook's affixation to the fish decoy.

A line attachment clip is provided in accordance with the principles of the present invention that is a unitary element having three connection loops, two of which are permanently closed and the third of which is releasable. A first closed loop, a line loop, provides the means for a length of fishing line to be attached. A rigid, heavy gauge leader is secured between a second closed loop of the line attachment clip, a leader loop, and the hook eyelet. A third connection loop comprising a resilient, releasable leg of the line attachment clip extends between a fixed connection to the base of the line attachment clip and the leader loop, but there is only contact and no physical attachment of the resilient, releasable leg to the leader loop, such that it remains releasable. The head eyelet of the lure engages and is held on the resilient, releasable leg until sufficient force is applied to the line to cause the head eyelet to snap off and be released from the resilient, releasable leg. Once that occurs, application of force on the fishing line causes the lure to flip about the hook eyelet and change its orientation so that further application of force to the line pulls the hook in the opposite direction, out of the snag.

BRIEF DESCRIPTION OF THE DRAWINGS

FIG. 1 is a front view illustrating the fishing lure of the present invention connected at both opposed ends of the fishing lure to the fishing line with the leader serving as an extension of the fishing line.

FIG. 2 is a perspective view illustrating the fishing lure of the present invention after becoming snagged on an underwater obstacle, depicted as a fallen tree branch.

FIG. 3 is a detailed view of the line attachment clip of the present invention depicting the use of the resilient, releasable leg.

DETAILED DESCRIPTION OF THE INVENTION

Figure 4:
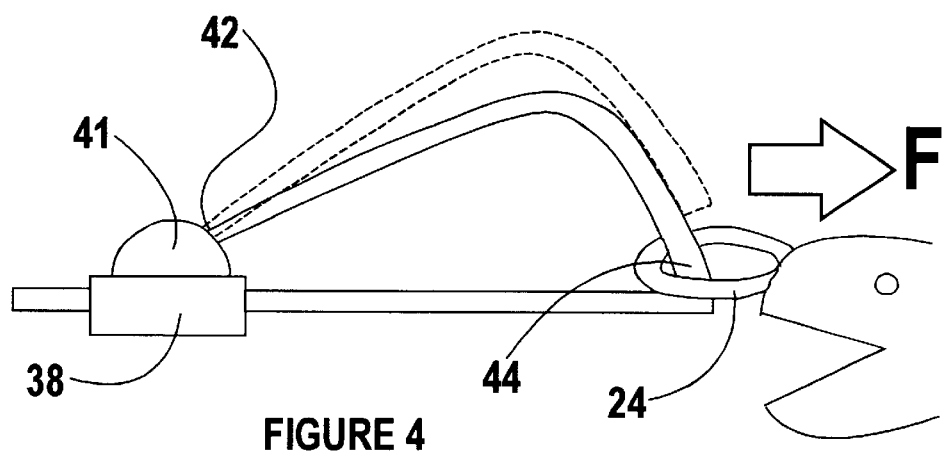
FIG. 4 is a schematic view of the line attachment clip of the present invention reflecting the release of the head end of the lure from the attachment clip upon application of adequate force.

The fishing lure 10 of the present invention solves the well known problem of snagging a fishing lure hook on an underwater obstacle. The fishing lure 10 of the present invention is shown in FIG. 2 snagged on an underwater tree limb 12, but the principles of the present invention are applicable to any snag condition and specifically do not limit the application thereof to only such snags.

Prior to the present invention, a fisherman encountering the problem illustrated in FIG. 2 would be forced to either cut the line 14 and abandon the lure 10 or, utilizing prior art devices, drop a weighted device down along the line 14 and hope that the weighted device struck the lure 10 with sufficient force to knock it free from the entanglement. As discussed herein, however, the use of the prior art weight device would not be effective if the line 14 was substantially horizontal, rather than vertical, since gravity would not move the weight toward the snagged lure with sufficient force to knock the lure 10 free. In addition, the prior art weight devices themselves may become entangled in the underwater obstacle, resulting in a loss of both the lure and the weighted device.

The present invention comprises a fishing lure 10 illustrated in FIG. 1 attached to a fishing line 14 which extends to a pole above the water (not shown). The lure 10 comprises a number of individual elements, the most important being a modified line attachment clip 16. The line attachment clip 16, shown in more detail in FIG. 3, comprises three connection loops, a line loop 30, a leader loop 32, and a releasable loop 36.

The fishing lure 10 of the present invention is advantageous over the prior art because it has means for attachment to the fishing line 14 that is partially releasable, as will be shown in more detail herein and advantageous because the partial release allows reorientation and inversion of the lure 10 after being snagged. The lure 10 generally comprises a bait device 18, shown as a decoy fish 18, that has a hook 20 permanently affixed at the tail end 22 of the decoy fish 18. The lure 10 has means for attachment to the fishing line provided by a head eyelet 24, mounted at the end of the decoy fish 18 opposite the hook 20, and a hook eyelet 26, mounted at the end of the hook 20 opposite the decoy fish 18. The means for attaching the lure 10 to the line 14 further comprises the three loop line attachment clip 16 and a heavy gauge leader 28. As shown in FIG. 1, the fishing line 14 is attached to the line loop 30 of the line attachment clip 16 (see FIG. 3) while the heavy gauge leader 28 is attached at the leader loop 32 of the line attachment clip 16. The leader 28 extends from the clip 16 to be connected at the other end to the hook eyelet 26. The leader 28 is connected to the clip 16 and the hook eyelet 26 in a fixed and non-releasable manner. The leader 28 is specifically and intentionally of sufficiently heavy gauge and rigid so that the lure 10 will behave generally as if there was no leader or second connection at the hook eyelet 26 until the lure 10 is released at the head eyelet 24. Further, the leader 28 is an appropriate length, approximately equal to the length of the combination of the decoy fish 18 and hook 20, so that it does not swing loose. Sizing the leader 28 in this manner prevents it from being the source of snags and does not interfere with the operation of the lure 10 to catch fish by moving through the water as though being pulled from the head eyelet 24. The hook eyelet 26 is necessarily affixed to a hook extension 34 that is secured to the end of the hook 20 opposite the fish decoy 18 as shown in FIG. 1. This location of the hook eyelet 26 is important as will be further illustrated herein because, after release of the head eyelet 24 from the fishing line 14, force applied to the line 14 will act to pull the hook 20 in the opposite direction (see FIG. 5).

The line attachment clip 16 further comprises a third connection loop 36, besides the line loop 30 and leader loop 32, having means for releasing an eyelet or line attached thereto comprising a resilient, releasable leg 36 that is affixed to a base 38, as shown in FIG. 3. The line loop 30 and leader loop 32 are securely affixed to the base 38 such that neither the line loop 30 nor the leader loop 32 can be opened or broken by application of force. The third loop comprising the resilient, releasable leg 36, on the other hand, generally exists as a closed loop between the base 38 and a point 40 at which it meets the leader loop 32, but it is specifically contemplated that application of sufficient force F on an eyelet attached thereto, such as the head eyelet 24 as shown in FIG. 4, to snap free and be released. The attachment of the resilient, releasable leg 36 to the base 38 is, in the most preferred embodiment of the present invention, effected by using a solder joint 41 to join an end 42 of the leg 36 to the base 38. The resilient, releasable leg 36, which in the most preferred embodiment of the present invention comprises an appropriate length of heavy gauge wire, is shaped and formed after the solder joint 41 has cooled such that the opposite end 44 of the leg 36 contacts the leader loop 32 as shown in FIG. 3. The solder joint 41 and composition of the material used for the resilient, releasable leg 36, are specifically designed and selected so that typical force applied to the line 14 in reeling in a hooked fish is not sufficient to cause the release of the head eyelet 24 from the resilient, releasable leg 36 but which, upon application of sufficient force F allows the eyelet 24 to be released, after which the resilient leg 36 returns to the position contacting the leader loop 32. Only upon application of the greater pull force F on the line 14 would the head eyelet 24 be released from the clip 16.

Figure 5:
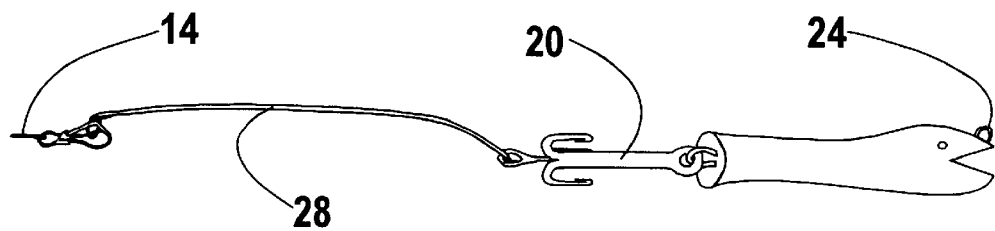
FIG. 5 is a schematic view of the fishing lure of the present invention after snagging and release of the head end of the lure and inversion of the lure.

A snag of the lure 10, as illustrated in FIG. 2, demonstrates the use and advantages of the present invention over the prior art. When the lure 10 is snagged on an underwater obstacle, such as the submerged tree branch 12, a quick yank on the line 14 will cause the head eyelet 24 to be released, as illustrated in FIG. 4. Reeling the line 14 in then is accomplished with the lure 10 in the opposite orientation, from the hook eyelet 26, the prongs of the hook 20, as well as the rest of the lure 10, inverted, as shown in FIG. 5. Thus, the lure 10 is inverted and released from the snag without the need for additional equipment. The elimination of the need for a snag release weight device is an important benefit of the present invention because it reduces cost and investment, and does not subject fisherman to additional losses if the weight becomes snagged.

In addition, the present invention is advantageous over the prior art by its simplicity and adaptation to lures of all kinds. The line attachment clip 16, comprising three closed loops, one of which is releasable as a result of the inclusion of a soldered resilient, releasable leg 36, provides the necessary release mechanism to carry out the principles of the present invention without requiring a spring loaded plunger, as taught by the prior art. Moreover, the clip 16 of the present invention is a single, unitary element that may be efficiently produced and readily replaced without affecting the remainder of the lure 10. Even after the line attachment clip 16 has been utilized to free the lure 10 from a snag, it can be reused because of the resilient character of the leg 36. The solder joint 41 and forming of the leg 36 from proper materials allow the reuse of the clip 16. In the event the line attachment clip 16 ever becomes fatigued or otherwise inoperable, however, the only element that needs replacement is the clip 16; the lure 10 can be salvaged by simply applying the new clip 16.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A snag releasable system for attaching a fishing line to a lure comprising:
    a bait device having a head eyelet mounted at a head end;
    a hook having one end affixed to a tail end of said bait device opposite said head end, said hook further comprising a hook eyelet mounted at an end of said hook opposite said one end affixed to said tail end of said bait device;
    a leader connected at one end to said hook eyelet, said leader further attached to said head eyelet of said bait device at a line attachment clip;
    wherein upon application of sufficient force to said leader, said line attachment clip is released from said head eyelet leaving said lure attached to said fishing line at said hook eyelet;
    wherein said lure and said hook become inverted into an opposite orientation allowing said lure and said hook to be released from a snag and reeled in.

2. The snag releasable system for attaching a fishing line tot a lure as set forth in claim 1 wherein said line attachment clip comprises a resilient, releasable leg.

3. The snag releasable system as set forth in claim 2 wherein said leader is rigid and approximately equal in length to the combination of said bait device and said hook.

* * * * *